G. DUNAVAN.
CORN CULTIVATOR.
APPLICATION FILED DEC. 27, 1917.
1,268,332.
Patented June 4, 1918.
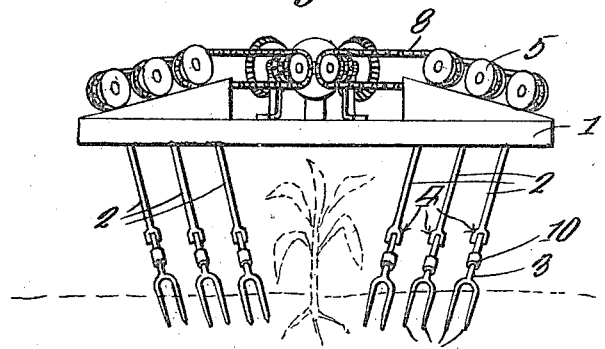
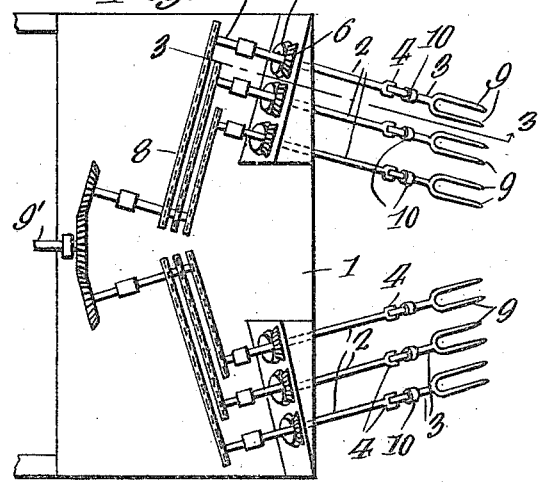
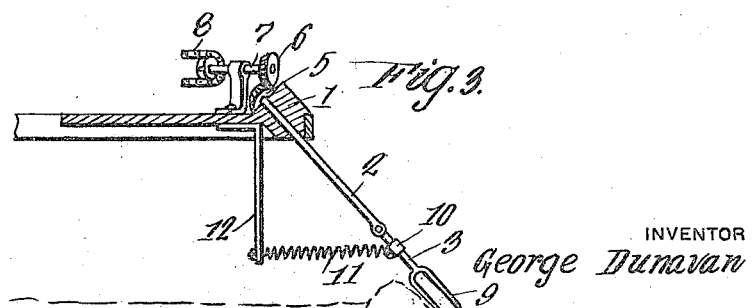
INVENTOR
George Dunavan
WITNESSES
BY
ATTORNEY

UNITED STATES PATENT OFFICE.

GEORGE DUNAVAN, OF MOUNT CITY, KANSAS.

CORN-CULTIVATOR.

1,268,332.

Specification of Letters Patent.     Patented June 4, 1918.

Application filed December 27, 1917. Serial No. 209,118.

*To all whom it may concern:*

Be it known that I, GEORGE DUNAVAN, a citizen of the United States, residing at Mount City, in the county of Linn and State of Kansas, have invented certain new and useful Improvements in Corn-Cultivators, of which the following is a specification.

This invention relates to a corn cultivator and has for its object the production of a simple and efficient corn cultivator which is adapted to cultivate the ground or soil between the rows of growing crops by means of a plurality of rotating cultivator members.

Another object of this invention is the production of a simple and efficient means for yieldably holding the cultivator fingers in engagement with the ground over which the device is passing.

With these and other objects in view this invention consists of certain novel constructions, combinations and arrangements of parts as will be hereinafter fully described and claimed.

In the drawings:—

Figure 1 is a rear elevation of the cultivator showing the cultivator arms carried thereby, Fig. 2 is a top plan view of the cultivator, Fig. 3 is a section taken on line 3—3 of Fig. 2.

By referring to the drawings, it will be seen that 1 designates the cultivator frame which supports a plurality of cultivator arms 2, the cultivator arms being arranged near the opposite sides of the cultivator frame, in two different series. These cultivator arms 2 are so mounted upon the cultivator frame 1 as to hang below the same, and these arms 2 extend inwardly toward the center of the frame 1 at an angle and also extend rearwardly at an angle to the horizontal axis of the frame 1.

Each of the cultivator arms 2 carries a swinging lower end 3 which is connected to the arms 2 by means of a universal joint 4 of any suitable construction for the purpose of accomplishing the desired results. Suitable driving gears 5 are carried by the upper ends of the cultivator arms 2 and these gears 5 mesh with suitable gears 6 carried by the shafts 7, the shaft 7 being driven by means of a sprocket chain 8 coöperating with a main driving shaft 9′. The swinging lower ends 3 of the cultivator arms 2 are provided with a pair of spaced cultivator fingers 9, for constituting a forked lower end.

The swinging lower ends 3 of the cultivator arms 2 carry loosely mounted collars 10 to which collars are secured the coil springs 11, the coil springs 11 being connected to the depending brackets 12.

From the foregoing description it will be seen that a very simple and efficient cultivator has been produced whereby the cultivator fingers 9 will dig into the soil and agitate the same due to the rotary motion of the swinging lower end 3. If however, the swinging lower ends 3 come in contact with an obstruction such as a stone or the like, the spring 11 will permit the swinging ends 3 to yieldably move away from the obstruction, in this way preventing the cultivator arms 2 from being broken or injured. As soon as the hinged or swinging lower end 3 has passed over the obstruction, the spring 11 will again hold the lower end 3 in engagement with the surface of the ground, and permit the fingers 9 to efficiently stir the surface of the ground and in this way greatly facilitate the pulverization of the top soil.

As shown clearly in Figs. 1 and 3, the cultivator arms 2 are inclined in two directions, that is to say, are inclined rearwardly and are also inclined toward the center of the frame 1.

It should be understood that any suitable or convenient guiding means may be employed for guiding the cultivator arms 2 and that the guiding means illustrated is only one of many means which may be employed for accomplishing the desired purpose.

What is claimed is:—

1. A cultivator comprising a support, a rotatable cultivator arm carried by said support, said cultivator arm provided with a swinging lower end, agitating fingers carried by said swinging lower end of said cultivator arm, and means for yieldably holding said swinging lower end of said arm in engagement with the ground over which said arms travel.

2. A cultivator comprising a support, a rotatable cultivator arm, said cultivator arm provided with a hinged lower end, agitating fingers carried by said hinged lower end, said arm extending downwardly and rearwardly at an angle to said frame, and a spring carried by said hinged lower end and anchored upon said support, for yieldably pulling said hinged lower end forwardly.

3. A cultivator comprising a support, a rotatable cultivator arm, said cultivator arm provided with a hinged lower end, agitating fingers carried by said hinged lower end, said arm extending downwardly and rearwardly at an angle to said frame, a spring carried by said hinged lower end, a depending bracket carried by said support, said spring anchored upon the lower end of said depending bracket, and said spring exerting a yieldable pulling action in a direct forward direction upon said hinged lower end.

In testimony whereof I affix my signature in presence of two witnesses.

GEORGE DUNAVAN.

Witnesses:
E. L. DOTY,
L. F. OSBORN.

Copies of this patent may be obtained for five cents each, by addressing the "Commissioner of Patents, Washington, D. C."